Figure 1:
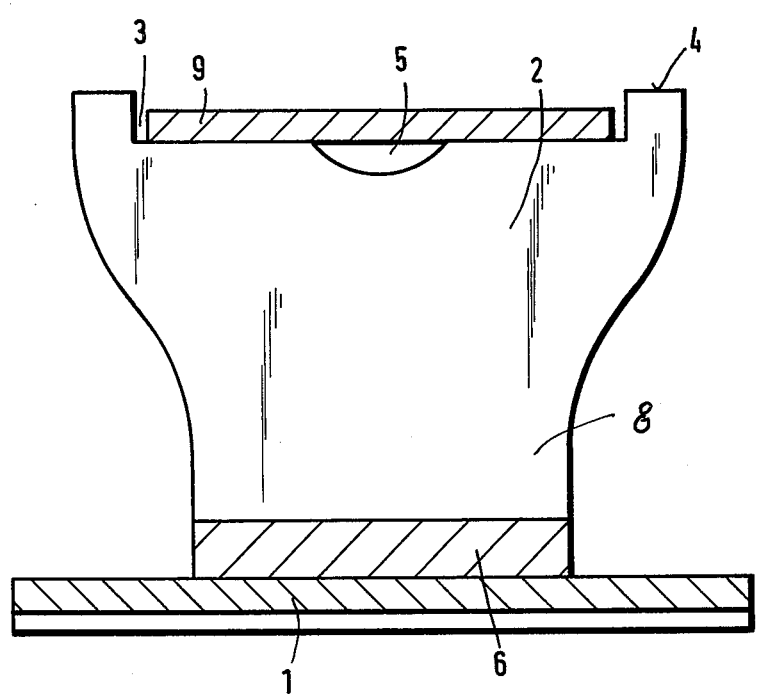

United States Patent [19]

Ries et al.

[11] 4,213,552
[45] Jul. 22, 1980

[54] CONVEYOR BELT FOR FILMSTRIP POSITIONING

[75] Inventors: Karl Ries, Mülheim; Kurt Hannoschöck, Sonsbeck; Krsto-Marijan Rozic, Düsseldorf; Günter Basler, Ahrensburg, all of Fed. Rep. of Germany

[73] Assignees: Mannesmannufer Aktiengesellschaft, Düsseldorf; Richard Seifert & Co. GmbH & Co. KG, Ahrensburg, both of Fed. Rep. of Germany

[21] Appl. No.: 904,743

[22] Filed: May 11, 1978

[30] Foreign Application Priority Data

May 11, 1977 [DE] Fed. Rep. of Germany ....... 7715354

[51] Int. Cl.² ........................................... B65H 17/34
[52] U.S. Cl. .................................................. 226/170
[58] Field of Search ................................ 226/170-173, 226/74, 75; 74/233, 234

[56] References Cited

U.S. PATENT DOCUMENTS

| 2,913,098 | 11/1959 | Zellinsky et al. ................. 226/171 X |
| 3,567,095 | 3/1971 | Geist ..................................... 226/172 |
| 3,778,094 | 12/1973 | Grolet et al. ............................ 294/1 |

Primary Examiner—Leonard D. Christian
Attorney, Agent, or Firm—Smyth, Pavitt, Siegemund, Jones & Martella

[57] ABSTRACT

A transport belt is constructed from a toothed belt as base with individual carrier elements separated by spacers. These elements each have a shallow trough with central indent and tapered base.

5 Claims, 2 Drawing Figures

CONVEYOR BELT FOR FILMSTRIP POSITIONING

BACKGROUND AND SUMMARY

The present invention relates to a conveyor belt for moving and positioning individual film strips.

A belt of the type to which the invention pertains will find particular utility for moving film strips into particular positions in relation to a test object, such as a pipe having a longitudinal welding seam to be X-rayed for non-destructive testing. The film strips are to be exposed by the X-rays as modulated by the texture of the test object or a portion thereof intercepting the X-ray beam. A test device of that type is disclosed in patent application Ser. No. 880 549 filed Feb. 23, 1978 by us and others and having common assignee. Such a belt must be constructed (a) to permit easy placement of a film strip onto a selected portion and position of the belt, (b) to hold the film strip safely during motion and (c) to release the film strip whenever desired.

In accordance with the preferred embodiment of the present invention, it is suggested to provide and to use a toothed belt, i.e. a belt with rack-like gearing, and to provide on the belt a carrier layer or cover of resilient, relatively soft material on top of the belt. The carrier layer is provided with a shallow trough or channel on top which extends in lengthwise direction, being interrupted on account of slots into the carrier for facilitating looping of the belt.

DESCRIPTION OF THE INVENTION

Figure 2:
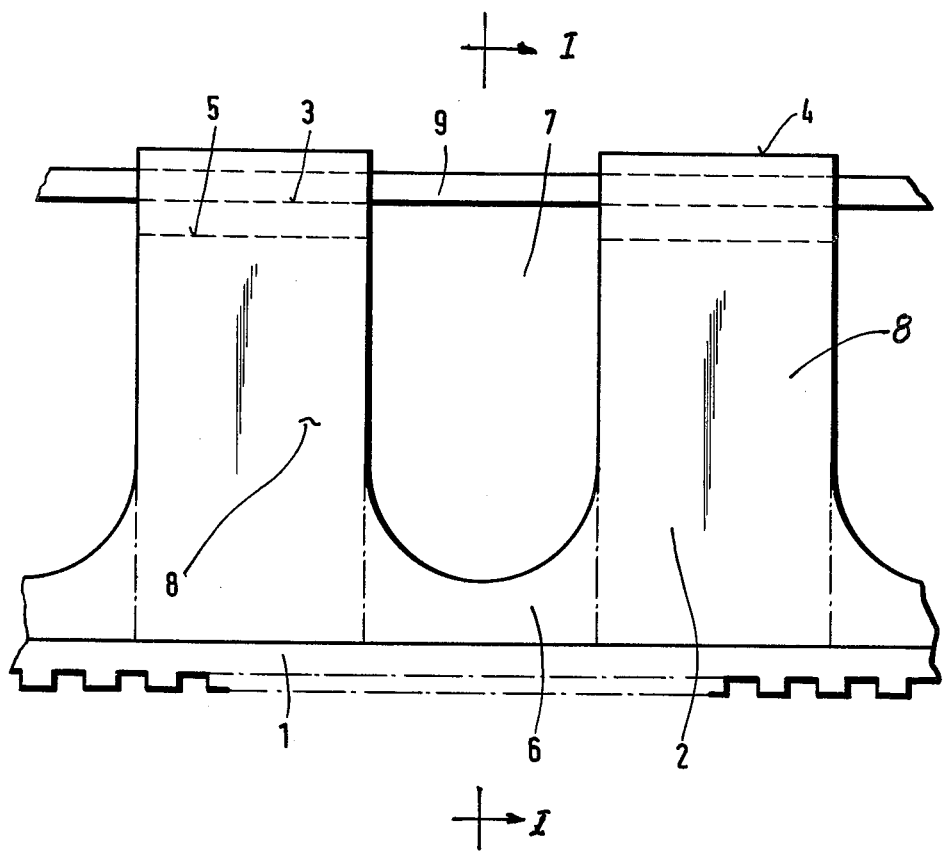

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawing in which:

FIG. 1 is a cross-section through a belt in accordance with the preferred embodiment taken along line 1—1 in FIG. 2; and FIG. 2 is a side view of the same belt as shown in FIG. 1.

Proceeding now to the detailed description of the drawings, the figures show a toothed belt 1 having downwardly extending teeth which extend transversely to the extension of the belt and the plane of the drawings of FIG. 1. The belt is sufficiently flexible to be looped around pulleys, but relatively strong with little resiliency to avoid length changes. This aspect is important because tension in longitudinal direction should not interfere with the lengthwise accuracy of positioning any specific point of the belt in particular stationary points for purposes of positioning any item the belt is carrying.

The belt 1 is provided with a rather resilient cover or layer 2 which permits yielding in transverse direction. One may use here foamed plastic to obtain adequate cushioning and resilient yielding. The cover 2 has deep cuts 7 to better accomodate the cover when the belt is looped around a drum or pulley. As a consequence, cover 2 is in effect subdivided into individual carrier posts 8 separated by spacing positions 6. Actually, the cover 2 may be assembled from individual pieces which alternate along the belt, a post 8 is followed by a spacer 6 which is followed by a carrier post 8, etc. The dash-dot line denotes the boundary between the pieces 8 and 6.

The upper portion of each post 8, that is the upper portion of the cover 2, but for the slots 7, is of U-shaped profile, i.e. it has a flat channel 3, down from the upper surface 4. This flat trough or channel receives a or a portion of a film strip 9, there being some clearance to the side walls of the trough for ease of placement and removal. One can say that each carrier post 8 is provided with such a trough or channel and the several channels of adjacent posts are aligned along the length extension of the belt.

The bottom of the channel or trough 3 is provided with a central identation 5. This indentation is needed to accommodate any protrusion of the test object, such as a welding seam of a pipe adjacent which the belt and film strip is pressed. One can also see that the individual carrier posts 8 have a tapered base on the belt to facilitate yielding of the carrier to assume a matching contour, when the film strips are being pressed against the carried contour of a pipe. The invention is not limited to the embodiments described above but all changes and modifications thereof not constituting departures from the spirit and scope of the invention are intended to be included.

We claim:

1. Conveyor belt for moving film strips into particular positions relative to a test object for exposure to X-rays examining the test object, comprising:
    a toothed belt and a cover on a surface of the belt facing away from the teeth of the belt, the cover being made of a material different from the material of which the belt is made, the cover having a considerably higher resiliency than the belt, said cover being constructed in respect to its surface contour as a shallow flat trough for holding such film.

2. Conveyor belt as in claim 1, said trough having a central concave indent in its bottom.

3. Conveyor as in claim 1, said cover having cuts to establish individual carrying posts.

4. Conveyor as in claim 1, said cover being made of individual, spaced apart pieces.

5. Conveyor as in claim 1 or 4, said cover tapering towards the belt.

* * * * *